(12) United States Patent
Diller

(10) Patent No.: US 6,768,947 B2
(45) Date of Patent: Jul. 27, 2004

(54) SYSTEM AND METHOD FOR ACCESSING AND ANALYZING PREVIOUS GENERATIONS OF SEISMIC DATA

(75) Inventor: Dave Diller, Parker, CO (US)

(73) Assignee: Landmark Graphics Corporation, a Halliburton Company, Houston, TX (US)

(*) Notice: Subject to any disclaimer, the term of this patent is extended or adjusted under 35 U.S.C. 154(b) by 0 days.

(21) Appl. No.: 10/237,242

(22) Filed: Sep. 6, 2002

(65) Prior Publication Data

US 2003/0046007 A1 Mar. 6, 2003

Related U.S. Application Data

(60) Provisional application No. 60/317,685, filed on Sep. 6, 2001.

(51) Int. Cl.$^7$ ................................................. G06F 19/00
(52) U.S. Cl. ......................................................... 702/14
(58) Field of Search ..................... 702/2, 6, 14; 367/73; 705/50, 51; 713/200, 201; 707/1, 9, 10

(56) References Cited

U.S. PATENT DOCUMENTS 5,828,751 A * 10/1998 Walker et al. .............. 713/175
5,987,125 A * 11/1999 Stringer et al. ............. 713/150
6,519,568 B1 * 2/2003 Harvey et al. ................ 702/14

OTHER PUBLICATIONS

Johnston, "From Exploration to Enhanced Production: Obtaining Seismic Services 'By the Drink,'" *Offshore*, Nov. 2001, pp. 30–31.

"ProMax to Transmute into Seis Space," Petroleum Data Manager, www.oilIT.com, May 2001, 1 page.

* cited by examiner

*Primary Examiner*—Donald McElheny, Jr.
(74) *Attorney, Agent, or Firm*—Needle & Rosenberg, P.C.

(57) ABSTRACT

A system and method for uniquely identifying seismic data sets, wherein the system and method associate a unique seismic data set identifier with a seismic data set, wherein the unique seismic data set identifier identifies the seismic data set by being different from all other unique seismic data set identifiers associated with other seismic data sets. The unique seismic data set identifier for the seismic data set is published within a directory, thus allowing the seismic data set to be found within a computer system or network of systems by the unique seismic data set identifier that is associated with the seismic data set.

12 Claims, 3 Drawing Sheets

SYSTEM AND METHOD FOR ACCESSING AND ANALYZING PREVIOUS GENERATIONS OF SEISMIC DATA

The benefit of the priority of provisional U.S. Patent Application Ser. No. 60/317685, filed Sep. 6, 2001, entitled "A SYSTEM AND METHOD FOR ACCESSING AND ANALYZING PREVIOUS GENERATIONS OF SEISMIC DATA," is hereby claimed, and the specification thereof is incorporated herein in its entirety by this reference.

BACKGROUND

Typically, seismic data sets comprise binary representations of the measurements of acoustic properties of a geographic location on the earth. Processing algorithms, such as image enhancements, are applied to seismic data sets. The processing function serves to manipulate the seismic data into a final form that is more easily understood by human data interpreters. The processed seismic data may be utilized in varying aspects, for example to aid in determining whether or not hydrocarbons are present in a specific geographic location.

The full processing sequence of a seismic data set typically involves processing several generations of seismic data, each of which is derived from the previous generation of seismic data. Thus a current seismic data set may have origins in ancestral data sets that are several generations removed from the current data set.

In a research environment, seismic data sets are typically processed by specialists in different departments, and usually in different companies than the interpreters who originally evaluated the processed seismic data. During the interpretation process it is often desirable to access previous generations of the data, to evaluate and reapply processing steps, or to attempt to extract additional information via different processing steps. Due to organizational barriers between processing and interpretation and because of the large size of seismic data sets, which are often on the order of hundreds of gigabytes, it is often difficult, expensive, and time consuming to access and manipulate previous generations of seismic data.

SUMMARY

The present invention provides a method and system to allow individuals to gain fast and inexpensive access to previous generations of seismic data, regardless of the storage location of the seismic data sets. In accordance with the invention, a data tagging/labeling system utilizes a persistent standard data tag or unique identifier to identify a seismic data set.

An exemplary embodiment of the present invention relates to a method for uniquely identifying seismic data sets. The method comprises the step of associating a unique seismic data set identifier with a seismic data set, wherein the unique seismic data set identifier uniquely identifies the seismic data set by being different from all other unique seismic data set identifiers associated with other seismic data sets. Additionally, the method comprises the step of publishing the unique seismic data set identifier for the seismic data set within a directory. The method enables the seismic data set to be found within a computer system or network of systems by the unique seismic data set identifier that is associated with the seismic data set.

An aspect of the exemplary embodiment of the present invention comprises the step of associating with a child seismic data set both the unique seismic data set identifier associated with the seismic data set and a unique child seismic data set identifier that uniquely identifies the child seismic data set by being different from all other unique seismic data set identifiers associated with other seismic data sets, wherein the child seismic data set comprises data processed from the seismic data set. Additionally, the method may comprise the step of associating with a child seismic data set all unique seismic data set identifiers associated with all ancestral seismic data sets from which the child seismic data set data is processed (i.e., the parent seismic data set, the grandparent seismic data set, etc.), and the unique seismic data set identifiers of all ancestral seismic data sets of the child seismic data set.

Another exemplary embodiment of the present invention relates to a system for uniquely identifying seismic data sets. The system comprises a processing system having one or more processing elements that are programmed or adapted to associate a unique seismic data set identifier with a seismic data set, wherein the unique seismic data set identifier uniquely identifies the seismic data set by being different from all other unique seismic data set identifiers associated with other seismic data sets. The system also publishes the unique seismic data set identifier for the seismic data set within a directory.

An aspect of the above-described exemplary embodiment enables the one or more system processing elements to be programmed or adapted to associate with a child seismic data set both the unique seismic data set identifier associated with the seismic data set, and a unique child seismic data set identifier that uniquely identifies the child seismic data set by being different from all other unique seismic data set identifiers associated with other seismic data sets, wherein the child seismic data set comprises data processed from the seismic data set. Further, the system can be programmed or adapted to associate with a child seismic data set all unique seismic data set identifiers associated with all ancestral seismic data sets from which the child seismic data set data is processed.

A further exemplary embodiment of the present invention relates to a computer program product used to uniquely identify seismic data sets. The computer program product comprises a computer-usable medium carrying thereon a means associating a unique seismic data set identifier with a seismic data set, wherein the unique seismic data set identifier uniquely identifies the seismic data set by being different from all other unique seismic data set identifiers associated with other seismic data sets. The computer program product additionally comprises a publishing means, wherein the publishing means publishes the unique seismic data set identifier for the seismic data set within a directory.

BRIEF DESCRIPTION OF THE DRAWINGS

The accompanying drawings, which are incorporated in and constitute a part of this specification, illustrate embodiments of the invention, and together with the description, serve to explain the principles of the invention.

DETAILED DESCRIPTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views. As utilized in the description herein and throughout the claims that follow, the meaning of "a," "an," and "the" include plural references also, unless the context of use clearly dictates otherwise. Additionally, the meaning of "in" includes "in" and "on" unless the context clearly dictates otherwise as the term is utilized in the description herein and throughout the claims that follow.

Figure 1:
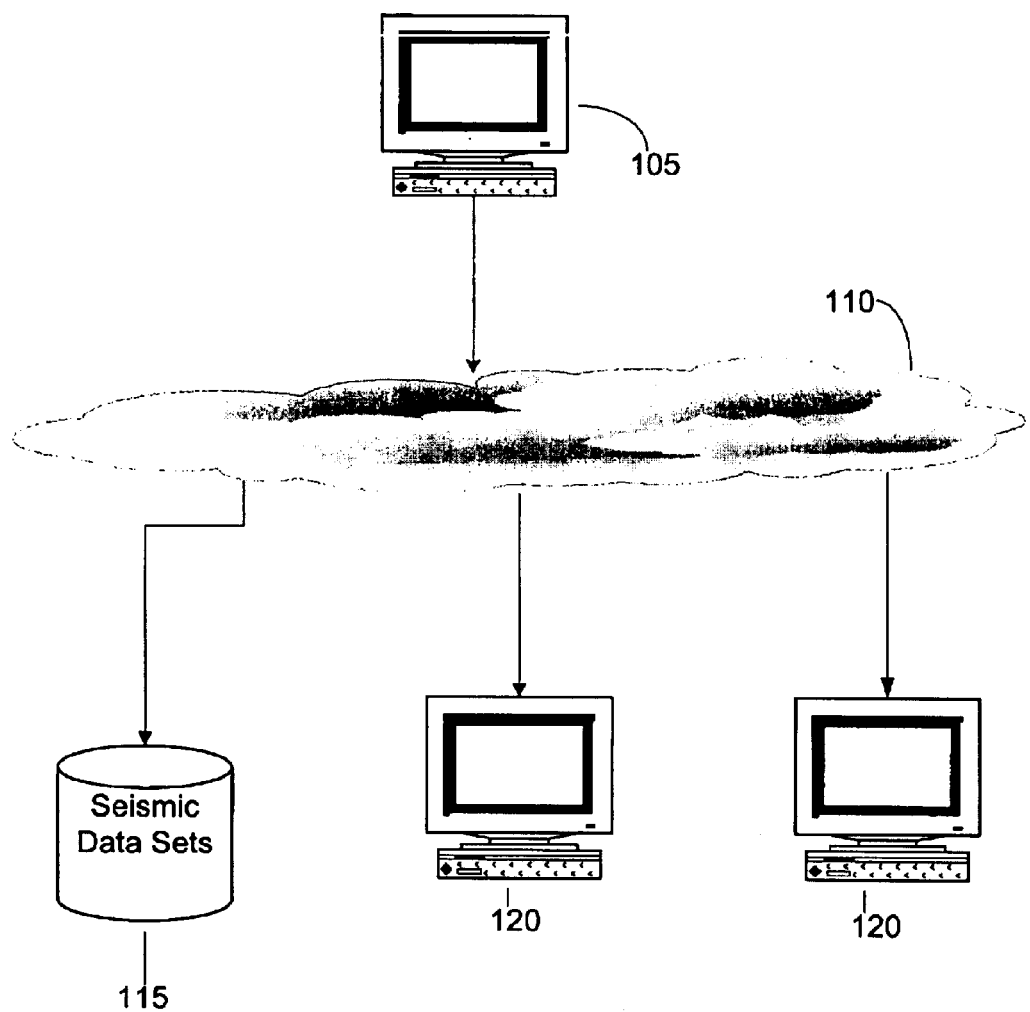
FIG. 1 illustrates a networked computer system in one embodiment of the present invention.
Figure 2:
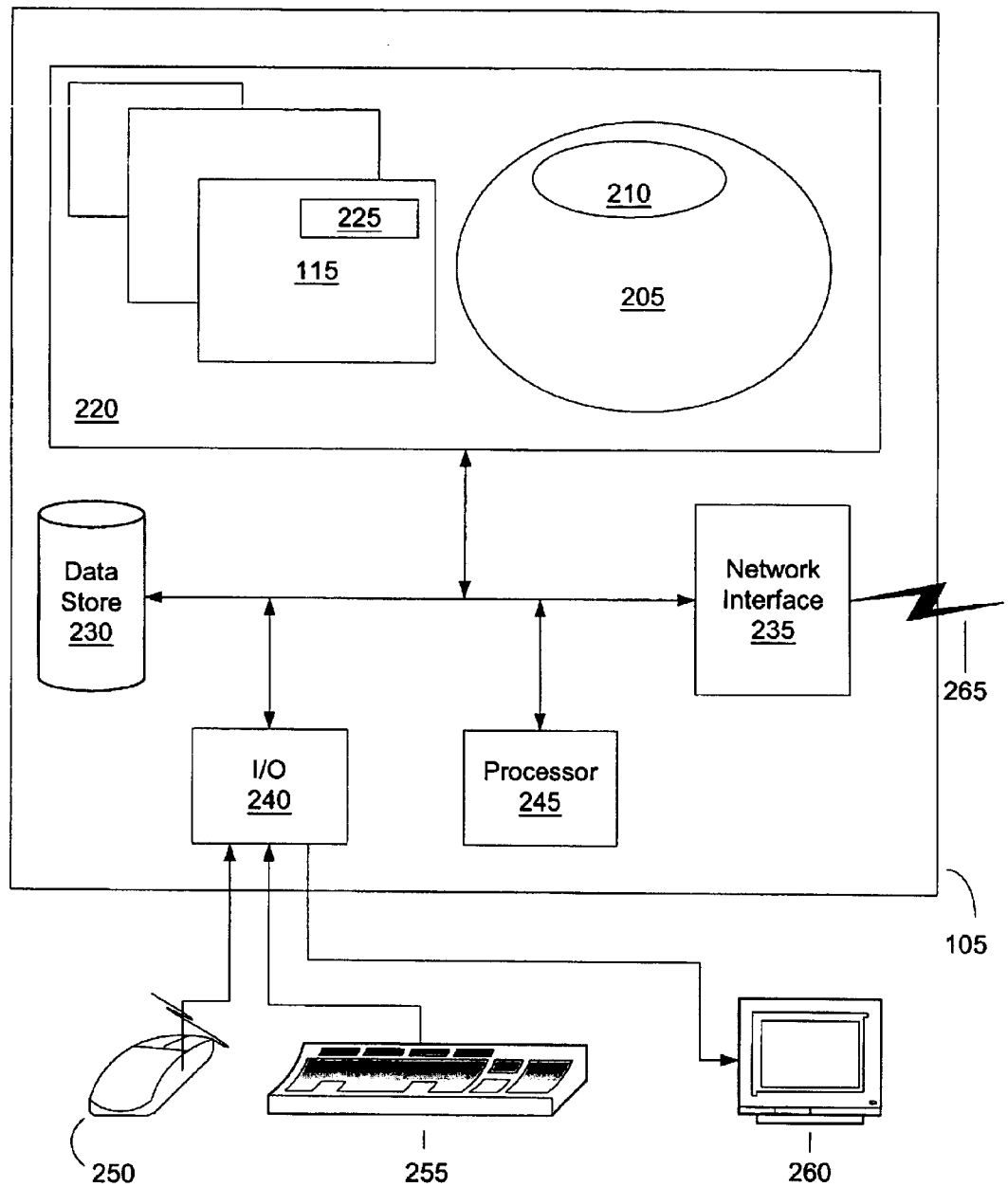
FIG. 2 illustrates a local host computer in one embodiment of the present invention.

As illustrated in FIGS. 1 and 2, standardized data tags or unique seismic data set identifiers 225 are used in conjunction with seismic data processing application software 205. Unique seismic data set identifiers 225 can serve as unique identification resources within a network directory or other environment. The unique seismic data set identifiers 225 are unique in time and space, and for this reason they serve as ideal keys in the searching and locating of data. Unique seismic data set identifiers 225 can include data that relates to the processing history and parameters of a specific seismic data set. Additionally, data that pertains to the acquisition of a specific seismic data set 115 and data interpretation parameters of a seismic data set 115 can be included in a unique seismic data set identifier 225.

Embodiments of the seismic data processing application software 205 computer codes that use the unique seismic data set identifiers 225 referenced herein can be written in the Java programming language, however, other programming languages that are utilized to develop application programs can also be used. The seismic data processing application software 205 described herein uses a derivative of the Lightweight Directory Access Protocol (LDAP) standard for its directory services. This derivative protocol is termed a "network directory" within the seismic data processing application software 205. The network directory service allows for the seismic data processing application software 205 to provide a global view of the resources that are available with a local area network, or site. Unique seismic data set identifiers 225 are used as unique identifiers within a network directory.

As shown in FIG. 1, a local host computer 105 can use unique seismic data set identifiers 225 to locate and access various stored database instances, projects, subproject, hosts, user settings, processing workflows, seismic data history, and seismic data sets 115 that may be accessed by additional network devices 120 through a network 110. Seismic data sets 115 may include, but are not limited to, prestack seismic data, poststack seismic data, velocity tables, pick tables, horizons, and gates.

FIG. 2 illustrates an embodiment of a local host computer 105 on which the seismic data processing application software 205 is operating. The local host computer 105 may include a user interface (not shown) that operates in accordance with conventional windowing graphical user interface (GUI) paradigms or any other user interface that may be utilized to display data that is used or displayed with implementations of this invention. Accordingly, to interface with the user, the computer includes a mouse 250, a keyboard 255 and a video display 260. The local host computer 105 also includes other hardware and software elements of the types generally included in conventional personal computers, such as a processor 245, disk storage device 230 such as a hard disk drive, input/output interfaces 240 and a network interface 235. The software elements of the programmed computer, such as seismic data sets 115, the seismic data processing application software 205 and the unique seismic data set identifier creation routine 210, are shown for purposes of clarity and illustration in a main memory 220, but as persons skilled in the art understand they may not in actuality reside simultaneously or in their entireties in memory 220. The computer has other hardware and software elements of the types conventionally included in personal computers, such as an operating system, but are not shown for purposes of clarity.

One exemplary use of unique seismic data set identifiers 225 used in the seismic data processing application software 205 is in a "site manager" (not shown). The site manager directly employs the network directory hashing methods that provides a user with the capability to access resources within the local area network 110 or site. Access to such resources is not restricted to a particular host or database instance, therefore a resource can be accessed on any host. The searches implemented in a particular database instance are recursive; this means that both the root level projects and subprojects within a particular database instance are searched. The site manager includes a method to start a process and return a Java Remote Method Invocation (RMI) service that represents a manager or service for a database instance, given the unique seismic data set identifier 225 for that database instance. The site manager also includes a method to return a Java RMI service that represents a database object such as a data set, given the unique seismic data set identifier 225 for that database object. The service for a database object is returned by querying all running instances of database managers for the object.

The unique seismic data set identifier 225 for an object never changes. This allows for the unique seismic data identifier 225 to be used in conjunction with the seismic data processing application software 205 to locate seismic data sets 115 that have been moved from one file system to another, or that have been backed up, removed, and then restored to a different location. The seismic data processing application software 205 includes a data search function that has the capability to browse through a computer's file systems and locate resources, such as seismic data, and then update the network directory based upon the particular unique seismic data set identifier 225 that is associated with the seismic data.

FIG. 2 illustrates an embodiment of the present invention in which the seismic data processing application software 205 uses the unique seismic data set identifier creation routine 210 to associate the unique seismic data set identifier 225 with a seismic data set 115 by embedding the unique seismic data set identifier 225 within the unique seismic data set identifier 225 of a particular seismic data set 115. This association technique allows for a specific seismic data set's 115 history to contained with the trace header of a seismic data set 115. In additional embodiments of the present invention, the unique seismic data set identifier creation routine 210 has the capability to embed the Internet Protocol (IP) address and/or local host computer name within a unique seismic data set identifier 225. This associating capability provides the seismic data processing application software 205 with the capability to create a unique seismic data set identifier 225 that can be used in the construction of a Java RMI Uniform Resource Locator (URL) that can access the site manager for the site that contains a particular resource or seismic data set 115. The configuration of an RMI URL is:

rmi://[host] [:port][/[objectName]]

Depending on the respective embodiment, the host can be either a local host computer name or the IP address of location where a seismic data set 115 is stored. Possessing a limited amount of information (for example, that the unique seismic data set identifier 225 corresponds to a seismic data set 115), the above-mentioned combinations of functionality can provide a remote user with the capability to access a local site manager that provides services that will allow the remote user to view and manipulate a particular seismic data set 115.

An exemplary embodiment of a unique seismic data set identifier 225 that can be created in the seismic data processing application software 205 comprises three distinct elements: an Internet Protocol address, a time stamp and a hash code. A further embodiment of a unique seismic data set identifier 225 comprises an Internet Protocol address, a time stamp, a hash code and the name of a local host computer. Nevertheless, in additional embodiments the unique seismic data set identifier 225 can comprise any one of the previously mentioned elements or any combination thereof. In still other embodiments, the unique seismic data set identifier can comprise any other suitable data that is uniquely associated with the respective seismic data set 115, wherein the term "unique" refers to data that can only be associated with or derived from a respective seismic data set 115.

Figure 3:
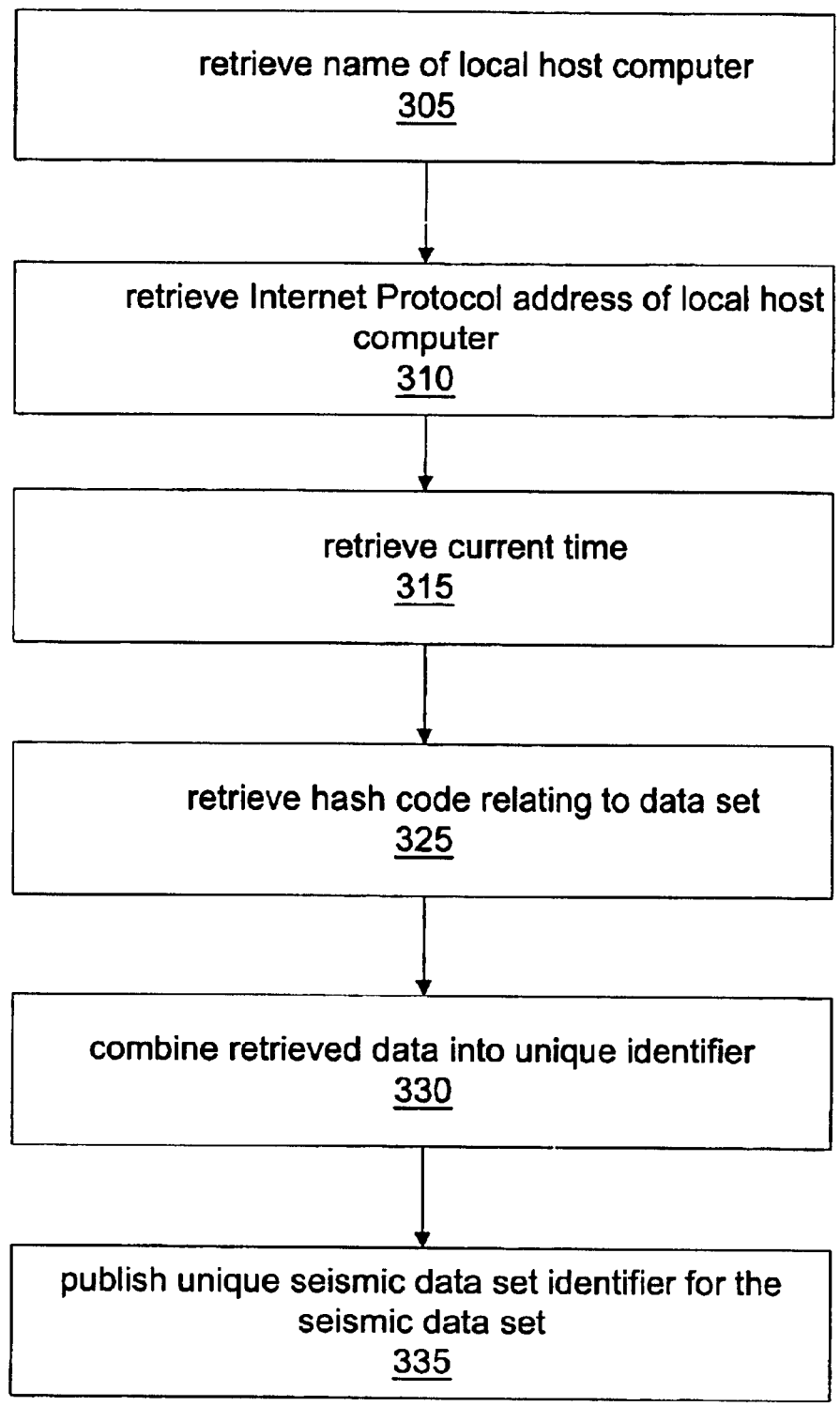
FIG. 3 is a flow chart diagram illustrating a method of the present invention in one embodiment.

FIG. 3 illustrates an exemplary embodiment of the present invention that relates to a method for the creation of a unique seismic data set identifier 225. At step 305, the name of the local host computer 105 where the seismic data processing application software 205 is running is retrieved. If the name of the local host computer 105 is set in any existing Java properties files, then the name is retrieved by using the java.lang.System.getProperties( ) command. If the name of the local host computer 105 is not set in any Java properties files, then it is fetched by the standard java.rmi.InetAddress.getLocalHost( ).getHostName( ) command. The name of the local host computer 105 will normally include the domain of the computer.

Next, at step 310, the IP address of the local host computer 105 is retrieved by the executing the java.rmi.InetAddress.getByName( ).getHostAddress( ) command. Further, at step 315, the current time is retrieved from the host by execution of the java.lang.System.currentTimeMillis( ) command.

A hash code is retrieved by the execution of the java.lang.Object( ).hashCode( ) command at step 325. A hash code is an integer value that is used to uniquely identify an object. Typically, a hash code is implemented by converting the internal memory address of an object into an integer.

At step 330, the local host computer name, the IP address, the current time, and the hash code are combined to create a unique seismic data set identifier 225. An example of typical unique seismic data set identifier 225 that includes the retrieved local host computer name, and with the current time and hash code being represented in Radix 32 to make them more compact, appears as follows:

prowess1.denver.1gc.com: 134.132.142.161 :tu627f6t:4egem

The local host computer name is identified as prowess1.Denver.1gc.com, the IP address is 134.132.142.161, the current time is tu627f6t and the hash code is 4egem. Although in the exemplary embodiments the unique seismic data set identifier 225 elements are combined by appending them one to another, in further embodiments they can be combined in any other suitable manner.

Lastly, at step 335, the unique seismic data set identifier 225 is published within a directory (not shown). This function may comprise the publishing of the unique seismic data set identifier 225 within specialized Internet web pages that are exposed to web search engines or specialized search server applications that can advertise the unique seismic data set identifiers 225 that are located within a specific server database.

An aspect of the above mentioned exemplary method embodiment of the present invention comprises the step of associating with a child seismic data set both the unique seismic data set identifier 225 associated with the seismic data set 115 and a unique child seismic data set identifier 225 that uniquely identifies the child seismic data set by being different from all other unique seismic data set identifiers 225 associated with other seismic data sets 115, wherein the child seismic data set comprises data processed from the seismic data set 115. Additionally, the method may comprise the step of associating with a child seismic data set all unique seismic data set identifiers 225 associated with all ancestral seismic data sets 115 from which the child seismic data set data is processed and the unique seismic data set identifiers 225 of all ancestral seismic data sets 115 of the child seismic data set.

An exemplary embodiment of the present invention relates to a system for uniquely identifying seismic data sets 115. The system comprises a processing system having one or more processing elements (see FIG. 2) that are programmed or adapted to associate a unique seismic data set identifier 225 with a seismic data set 115, wherein the unique seismic data set identifier 225 uniquely identifies the seismic data set 115 by being different from all other unique seismic data set identifiers 225 associated with other seismic data sets 115. The system also publishes the unique seismic data set identifier 225 for the seismic data set 115 within a directory.

An aspect of the above embodiment comprises one or more processing elements (see FIG. 2) programmed or adapted to associate with a child seismic data set both the unique seismic data set identifier 225 associated with the seismic data set 115 and a unique child seismic data set identifier that uniquely identifies the child seismic data set by being different from all other unique seismic data set identifiers 225 associated with other seismic data sets 115, wherein the child seismic data set comprises data processed from the seismic data set 115. Further, the system can be programmed or adapted to associate with a child seismic data set all unique seismic data set identifiers 225 associated with all ancestral seismic data sets 115 from which the child seismic data set data is processed.

A unique seismic data set identifier 225 for a seismic data set 115 may be created by retrieving and combining the Internet Protocol address where a data set 115 is stored, the current time and the hash code of the stored data set 115. An additional aspect of the above embodiment creates a unique seismic data set identifier 225 by combining the name of the local host computer along with the fore mentioned retrieved data.

A further exemplary embodiment of the present invention relates to a computer program product (see FIG. 2) that is used to uniquely identify seismic data sets 115. The computer program product comprises a computer-usable medium carrying thereon a means for associating a unique seismic data set identifier 225 with a seismic data set 115, wherein the unique seismic data set identifier 225 uniquely identifies the seismic data set 115 by being different from all other unique seismic data set identifiers 225 associated with other seismic data sets 115. The computer program product additionally comprises a publishing means, wherein the publishing means publishes the unique seismic data set identifier 225 for the seismic data set 115 within a directory.

A yet further exemplary embodiment of the present invention relates to a system for uniquely identifying seismic data sets 115. The system comprises a processing system that has one or more processing elements (see FIG. 2) that are programmed or adapted to embed a unique seismic data set identifier 225 within a seismic data set 115, wherein the unique seismic data set identifier 225 uniquely identifies the seismic data set 115 by being different from all other unique seismic data set identifiers 225 associated with other seismic data sets 115. The unique seismic data identifier 225 is created by the following steps: retrieving the Internet Protocol address of the local host computer in which the data set 115 is located; retrieving the current time, in milliseconds, that the unique identifier creation function is initiated; and retrieving a hash code that relates to the data set 115. The retrieved data, comprising the Internet Protocol address, the current time and hash code, are combined by the system, and thus form a unique seismic data set identifier 225. Summarily, the unique seismic data set identifier 225 for the seismic data set 115 is published within a directory.

Other aspects of the invention may be found from the attached drawings and other related materials such as a detailed review of the various functions offered by the present invention, which are integral parts of this disclosure. Moreover, other embodiments of the invention will be apparent to those skilled in the art from consideration of the specification and practice of the invention disclosed herein. It is intended that the specification and examples be considered as exemplary only.

What is claimed:

1. A computer-implemented method for uniquely identifying seismic data sets within a computer-accessible collection of one or more seismic data sets, comprising the steps of:

associating a first unique seismic data set identifier with a parent seismic data set, wherein the first unique seismic data set identifier identifies the parent seismic data set by being different from all other unique seismic data set identifiers associated with other seismic data sets, and wherein a computer can access the parent seismic data set in response to the first unique seismic data set identifier; and publishing the unique seismic data set identifier for the parent seismic data set within a computer-accessible directory;

producing a child seismic data set from the parent seismic data set in response to processing of the parent seismic data set;

associating a different unique seismic data set identifier with the child seismic data set, wherein the different unique seismic data set identifier identifies the child seismic data set by being different from all other unique seismic data set identifiers associated with other seismic data sets, and wherein a computer can access the child seismic data set in response to the different unique seismic data set identifier;

publishing the different unique seismic data set identifier for the child seismic data set within a computer-accesible directory;

repeating zero or more times the steps of producing a child seismic data set, associating a different unique seismic data set identifier with the child seismic data set, and publishing the different unique seismic data set identifier, wherein each child seismic data set has associated with it all unique seismic data set identifiers associated with all ancestral seismic data sets from which the child seismic data set data is processed.

2. The method of claim 1, wherein each unique seismic data set identifier is created in response to at least one of an Internet Protocol address, a current time, or a hash code.

3. The method of claim 1, wherein each unique seismic data set identifier is created in response to an Internet Protocol address, a current time, and a hash code.

4. The method of claim 3, wherein each unique seismic data set identifier for the seismic data set is further created in response to a host computer name.

5. The method of claim 1, wherein:

the step of associating a first unique seismic data set identifier with a parent seismic data set comprises the step of embedding the first unique seismic data set identifier within the parent seismic data set; and the step of associating the different unique seismic data set identifier with the child seismic data set comprises the step of embedding the different unique seismic data set identifier within the child seismic data set.

6. A system for uniquely identifying seismic data sets, comprising a processing system having one or more processing elements that are programmed or adapted to:

associate a first unique seismic data set identifier with a first seismic data set, wherein the first unique seismic data set identifier identifies the parent seismic data set by being different from all other unique seismic data set identifiers associated with other seismic data sets, and wherein a computer can access the parent seismic data set in response to the first unique seismic data set identifier; and publish the parent unique seismic data set identifier for the parent seismic data set within a computer-accessible directory;

produce a child seismic data set from the parent seismic data set in response to processing of the parent seismic data set;

associate a different unique seismic data set identifier with the child seismic data set, wherein the different unique seismic data set identifier identifies the child seismic data set by being different from all other unique seismic data set identifiers associated with other seismic data sets; and publish the different unique seismic data set identifier for the seismic data set within a directory;

continue zero or more times to produce child seismic data sets, associate a different unique seismic data set identifier with each child seismic data set, and publish the different unique seismic data set identifier for each child seismic data set, wherein each child seismic data set has associated with it all unique seismic data set identifiers associated with all ancestral seismic data sets from which the child seismic data set data is processed.

7. The system of claim 6, wherein each unique seismic data set identifier is created in response to at least one of an Internet Protocol address, a current time, or a hash code.

8. The system of claim 6, wherein each unique seismic data set identifier is created in response to an Internet Protocol address, a current time, and a hash code.

9. The system of claim 8, wherein each unique seismic data set identifier for the seismic data set is further created in response to a host computer name.

10. The system of claim 6, wherein the parent unique seismic data set identifier is associated with the parent seismic data set by embedding the parent unique seismic data set identifier within the parent seismic data set, and the different unique seismic data set identifier is associated with the child seismic data set by embedding the different seismic data set identifier within the child seismic data set.

11. A computer program product for uniquely identifying seismic data sets, comprising a computer-usable medium carrying thereon:

- a means for associating a first unique seismic data set identifier with a parent seismic data set, wherein the first unique seismic data set identifier identifies the parent seismic data set by being different from all other unique seismic data set identifiers associated with other seismic data sets, and wherein a computer can access the parent seismic data set in response to the first unique seismic data set identifier; and
- a publishing means, wherein the publishing means publishes the first unique seismic data set identifier for the parent seismic data set within a directory;
- means for producing a child seismic data set from the parent seismic data set in response to processing of the parent seismic data set;
- means for associating a different unique seismic data set identifier with the child seismic data set, wherein the different unique seismic data set identifier identifies the child seismic data set by being different from all other unique seismic data set identifiers associated with other seismic data sets, and wherein a computer can access the child seismic data set in response to the different unique seismic data set identifier;
- wherein the publishing means further publishes the different unique seismic data set identifier for the child seismic data set within a computer-accessible directory; and wherein the means for producing a child seismic data set produces a child seismic data set one or more times, the means for associating a different unique seismic data set identifier with the child seismic data set associates a different unique seismic data set identifier with each child seismic data set, the publishing means publishes each different unique seismic data set identifier, and wherein each child seismic data set has associated with it all unique seismic data set identifiers associated with all ancestral seismic data sets from which the child seismic data set data is processed.

12. A system for uniquely identifying seismic data sets, comprising a processing system having one or more processing elements that are programmed or adapted to:

- embed a unique seismic data set identifier within a seismic data set, wherein the unique seismic data set identifier identifies the seismic data set by being different from all other unique seismic data set identifiers associated with other seismic data sets, the unique seismic data identifier being created by the following steps:
  - a) retrieving a name of a local host computer where the data set is located;
  - b) retrieving an Internet Protocol address of the local host computer in which the data set is located;
  - c) retrieving a current time, in milliseconds, that the unique identifier creation function is initiated;
  - d) retrieving a hash code that relates to the data set;
  - e) combining the Internet Protocol address, the current time and hash code in order to form a unique seismic data set identifier; and publish the unique seismic data set identifier for the seismic data set within a directory.

* * * * *